March 31. 1925.
A. C. SCHAEFER
TRIMMER
Filed March 5, 1924
1,532,082
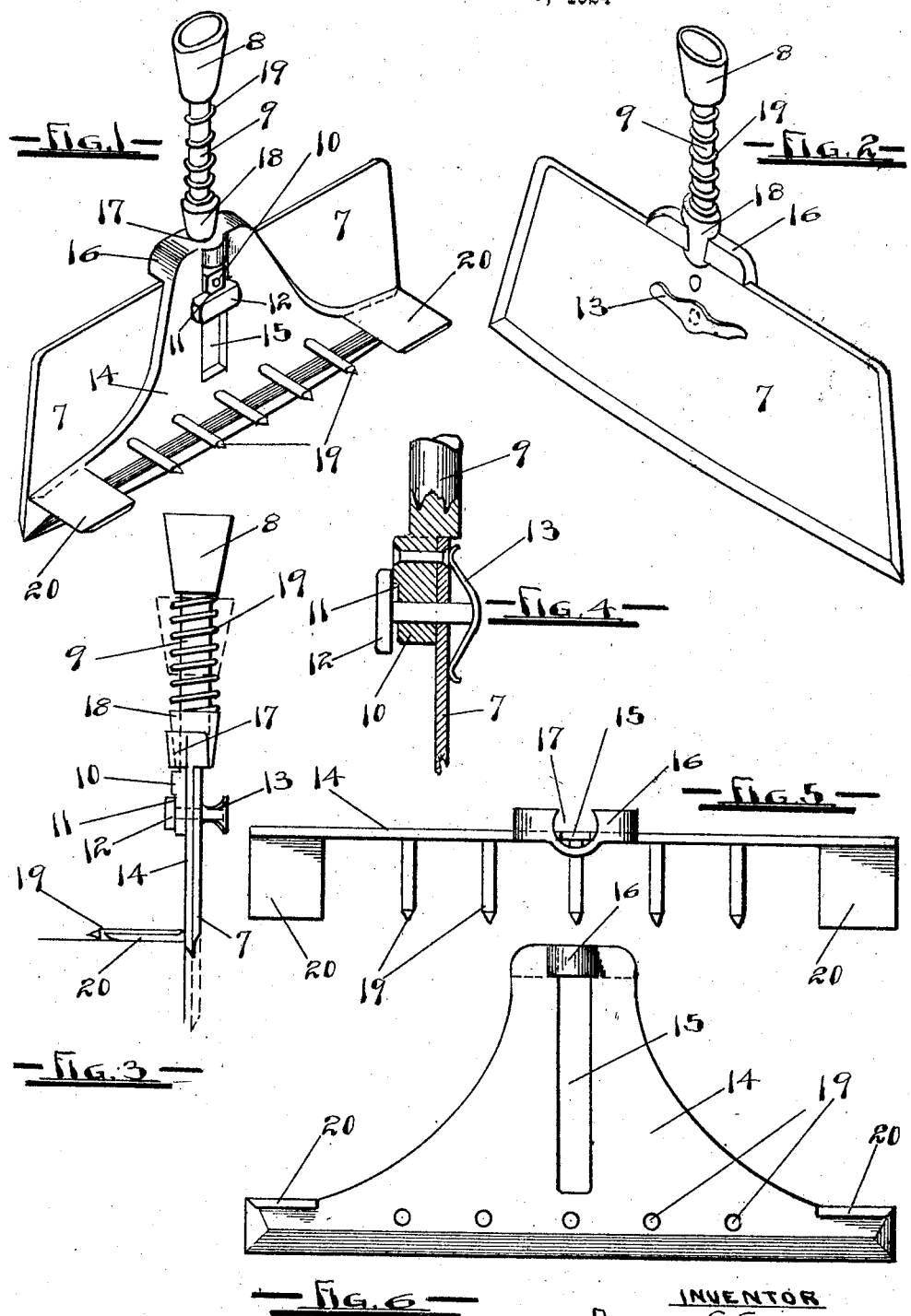

Patented Mar. 31, 1925.

1,532,082

UNITED STATES PATENT OFFICE.

AUGUST C. SCHAEFER, OF PORTLAND, OREGON.

TRIMMER.

Application filed March 3, 1924. Serial No. 696,620.

*To all whom it may concern:*

Be it known that I, AUGUST C. SCHAEFER, a citizen of the United States, residing at Portland, county of Multnomah, State of Oregon, have invented certain new and useful Improvements in Trimmers, of which the following is a specification.

My invention relates to trimmers in general, and particularly to lawn trimmers, the object being to provide a device whereby the edges of lawns around walks and gardens may be easily and expeditiously trimmed. I accomplish this object, and other desirable results that will hereinafter appear, by means of the construction illustrated in the accompanying drawing, which is a part of this application, like characters of reference indicating like parts throughout the several views thereof, and in which:

Fig. 1 is a perspective view of my device showing the guard side thereof.

Fig. 2 is a perspective view of the same showing the cutting edge thereof.

Fig. 3 is a side elevation of my device.

Fig. 4 is a fragmentary sectional view showing the retaining bolt construction.

Fig. 5 is a plan view of the guard member.

Fig. 6 is an elevation of the guard member.

In general my device consists of a cutter secured to a handle and adapted to be thrust into the ground to cut the grass, and a guard adapted to rest upon the edge of the lawn, or other object such as a walk, which it is wished to trim in a straight and even line, and means for operating said cutter when said guard is in position.

The cutter is secured to a socket member adapted to receive a handle within a socket 8, having a stem 9, and a lug 10, which lug is riveted or otherwise secured to the cutter 7.

Said lug 10 is notched as shown at 11 in Fig. 4 to provide a seat for the head 12 of a retaining bolt. Said retaining bolt passes through said lug and said cutter and upon the cutter end thereof terminates in a spring clip 13. This spring clip causes the head 12 to always be in firm contact with the lug 10. When the various members of the device are assembled, said head 12 lies transversely of the lug 10 as shown in Fig. 1, and projects beyond the edges of the lug. In this position the head 12 lies upon the surface of the notch in the lug 10, and is prevented from turning by the projection of the edge of the said notch. When it is desired to assemble or disassemble the various members, said head is turned to a position ninety degrees from that just described, when the head 12 will lie upon the projecting portion of the lug 10, as shown in Fig. 4. This is easily accomplished by pressing upon the spring clip 13 sufficiently to cause the head to clear the projecting portion of the lug.

The guard member 14 is adapted to lie upon that side of the cutter whereupon said lug is disposed, and is provided with a slot 15 to receive said lug 10. It is placed in position upon said cutter when the head 12 is in the position shown in Fig. 4, alined with the stem 9 and with the position to be assumed by the slot 15. When thus in position the guard member 14 is slidable upon the cutter 7, the lug 10 sliding within the slot 15. The guard member 14 is provided with a lug 16 projecting normal to the surface thereof, and adapted to contact with the upper edge of the cutter 7 when the parts are assembled and in idle position. Said lug 16 is provided with an orifice 17 having an opening of sufficient width to receive the stem 9 when the parts are assembled.

Upon the stem 9 there is disposed a conical thimble 18 adapted to enter said orifice 17, and a spring 19 is provided upon said stem 9 between the socket 8 and the thimble 18 to press the latter firmly into the orifice 17.

Teeth 19 are provided upon the guard member 14 to serve a double purpose; to rest upon the edge of the lawn or walk that it is wished to trim, as shown in Fig. 3, and also to act as rake teeth when desired to use the device as an ordinary rake. The end teeth are widened to form small hoes 20.

In use my device is placed alongside the edge it is wished to trim, with the teeth 19 and hoes 20 resting thereupon, as shown in Fig. 3, and the handle is then depressed, thus thrusting the cutter 7 into the ground alongside the edge to be trimmed, and cutting all grass and refuse. The pressure upon the handle is then released, and the spring 19 causes the cutter to return to its initial position relative to the guard member 14. This process is repeated along the edge to be trimmed, resulting in a clean and straight edge to the lawn.

The rake teeth 19 may be used for raking up the refuse as it accumulates, and the hoes 20 may be used for working around bushes and plants. The edges of the cutter 7 are sharpened, as are also those of the hoes 20. The lower edge of the guard member is also sharpened so as to be easily pressed into the grass of a lawn when desired. Also a feature of my device is that the constant passing of the sharpened edge of the cutter over the sharpened edge of the guard member tends to keep the edge of the cutter in good shape. The cutter may be used with the guard member removed if desired for general garden work.

My device may be made of any size, and constructed of any materials deemed convenient and suitable for a device of this size, and while I have illustrated and described a form of construction and arrangement of parts found desirable in materializing my invention, I wish to include in this application all mechanical equivalents or substitutes that may fairly be considered to come within the scope and purview of my invention as defined in the appended claims.

Having disclosed my invention so that others may be enabled to construct and to use the same, what I claim as new, and desire to secure by Letters Patent is:

1. In a trimmer: a cutter blade; a stem thereupon; a guard member mounted upon said cutter blade and embracing said stem; a spring upon said stem to retain said guard in its lowermost position; and feet upon said guard.

2. In a trimmer for lawn edges: a guard to protect the edge consisting of a vertical body, hoes upon the extreme ends of the lower edge of said body, and teeth intermediate said hoes, said hoes and said teeth coacting to form feet for said guard; and a cutter slidably attached to said guard and operated by a stem.

3. The combination of a cutter; a guard slidably mounted upon said cutter; hoes upon the extremities of said guard; and rake teeth intermediate said hoes; said hoes and said rake teeth coacting with said guard to protect the lawn edge.

4. In a trimmer: a cutter blade; a stem upon said blade; a rotatable retaining bolt upon said cutter blade; a guard mounted upon said cutter blade, and having a slot therein to receive said bolt; a lug upon said guard embracing said stem; and a spring upon said stem contacting with said lug to hold said guard in its lowermost position.

In witness whereof I claim the foregoing as my own I hereunto affix my signature in the presence of two witnesses, at Portland, county of Multnomah, State of Oregon, this 20th day of Feb., 1924.

AUGUST C. SCHAEFER.

Witnesses:
L. J. ROBINSON,
C. F. BLAKE.